United States Patent
Coiro, Sr. et al.

(10) Patent No.: US 6,308,660 B1
(45) Date of Patent: Oct. 30, 2001

(54) BIO-CONTAINMENT ANIMAL CAGE SYSTEM

(75) Inventors: Michael A. Coiro, Sr., Jacobstown; Frank J. Herdt, Bordentown; Brian M. Bilecki, Trenton, all of NJ (US)

(73) Assignee: Allentown Caging Equipment Co., Inc., Allentown, NJ (US)

( * ) Notice: Subject to any disclaimer, the term of this patent is extended or adjusted under 35 U.S.C. 154(b) by 0 days.

(21) Appl. No.: 09/334,955

(22) Filed: Jun. 17, 1999

(51) Int. Cl.[7] .................................................. A01K 1/00
(52) U.S. Cl. .......................... 119/419; 119/420; 119/50 D
(58) Field of Search ................................... 119/419, 418, 119/420, 493, 500, 72, 72.5, 75

(56) References Cited

U.S. PATENT DOCUMENTS

| | | | |
|---|---|---|---|
| 3,924,571 | * 12/1975 | Holman | 119/419 |
| 4,037,563 | * 7/1977 | Pflueger et al. | 119/269 |
| 4,249,482 | 2/1981 | Harr . | |
| 4,343,261 | 8/1982 | Thomas . | |
| 4,365,590 | 12/1982 | Ruggieri et al. . | |
| 4,402,280 | 9/1983 | Thomas . | |
| 4,528,941 | 7/1985 | Spengler . | |
| 4,690,100 | 9/1987 | Thomas . | |
| 4,699,088 | * 10/1987 | Murray et al. | 119/419 |
| 4,940,017 | * 7/1990 | Niki et al. | 119/418 |
| 5,000,120 | 3/1991 | Coiro, Sr. et al. . | |
| 5,044,316 | * 9/1991 | Thomas | 119/419 |
| 5,048,459 | 9/1991 | Niki et al. . | |
| 5,307,757 | 5/1994 | Coiro, Sr. et al. . | |
| 5,349,923 | * 9/1994 | Sheaffer et al. | 119/418 |
| 5,385,118 | * 1/1995 | Coiro, Sr. et al. . | |
| 5,809,936 | * 9/1998 | Wall | 119/484 |
| 5,865,144 | * 2/1999 | Semenuk | 119/456 |
| 5,996,535 | * 12/1999 | Semenuk et al. | 119/456 |
| 6,041,741 | * 3/2000 | Gabriel et al. | 119/417 |
| 6,092,487 | * 7/2000 | Niki et al. | 119/420 |
| 6,098,959 | * 8/2000 | Momont et al. | 251/367 |
| 6,138,610 | * 10/2000 | Niki | 119/418 |
| 6,164,311 | * 12/2000 | Momont et al. | 137/171 |

* cited by examiner

*Primary Examiner*—Michael J. Carone
*Assistant Examiner*—Yvonne R. Abbott
(74) *Attorney, Agent, or Firm*—Mathews, Collins, Shepherd, & Gould, P.A.

(57) ABSTRACT

The present invention comprises an animal caging system including a self-sealing animal cage removably connected to an air supply and an exhaust. The self-sealing animal cage is supported by a rack. The self-sealing animal cage is sealed by an air inlet connection and an air outlet connection to the air supply and the exhaust connection. After the cages are removed from the air supply and the exhaust, the air inlet connection and the exhaust connection seals the cage to prevent air from entering or exiting the cage. Accordingly, the animal caging system provides isolation of the self-sealing animal cage and provides containment of airborne pathogens within the caging system. A bio-sensing cage is used in the animal cage system to measure pressure of animal cage connected to the air supply and exhaust which contains an animal. The measurement of pressure in the bio-sensing cage is used by a controller to maintain pressure in the cages independently of environment and cage conditions. The measurement of pressure in the bio-sensing cage can be displayed. An alarm can be activated in the measured pressure in the cage is outside a predetermined tolerance for the cage.

66 Claims, 10 Drawing Sheets

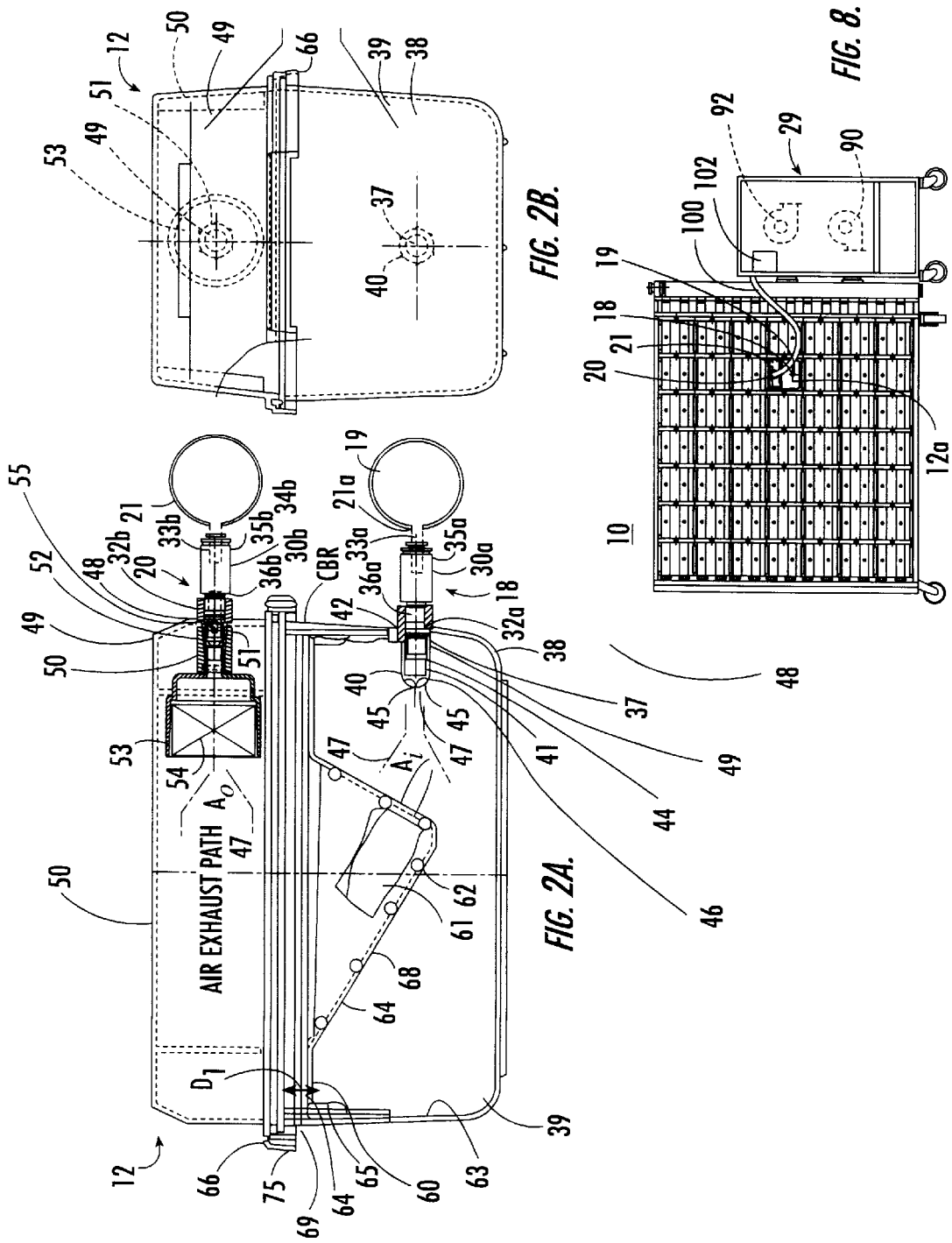

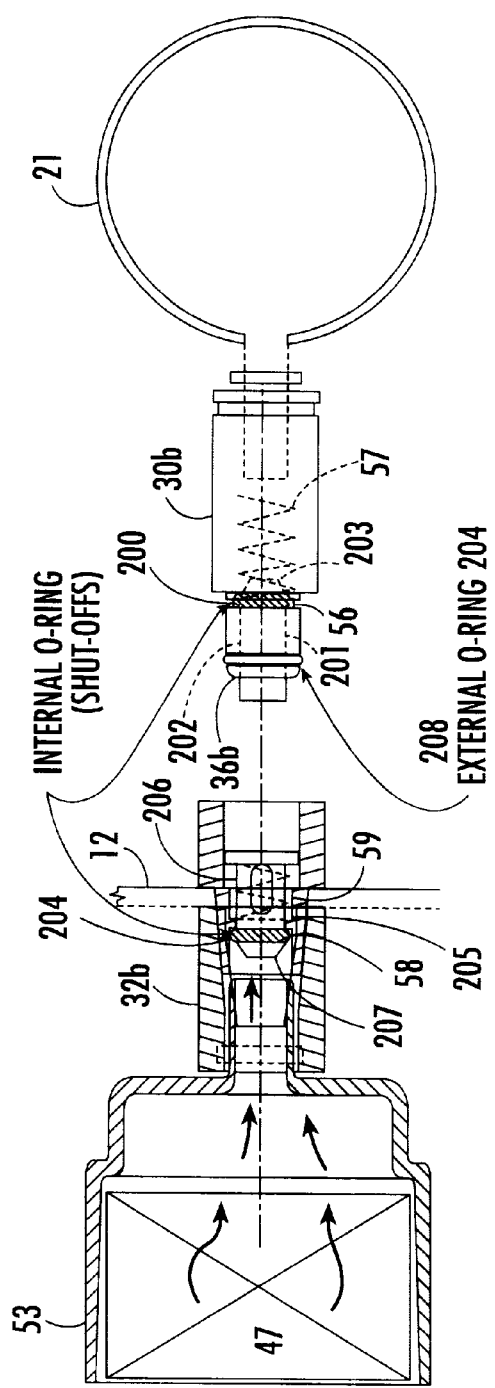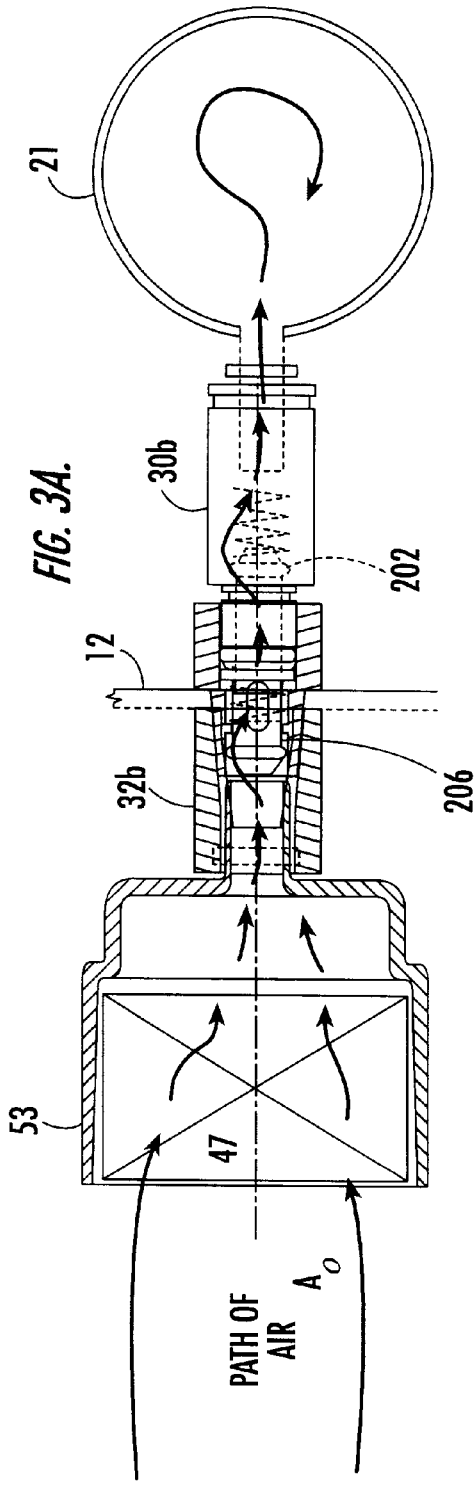
FIG. 3A.
FIG. 3B.

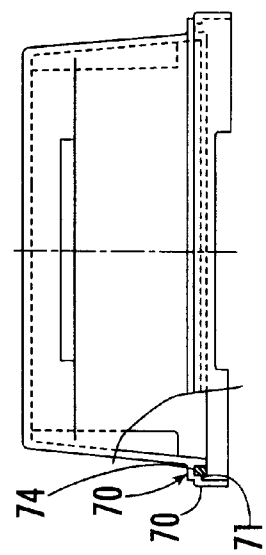
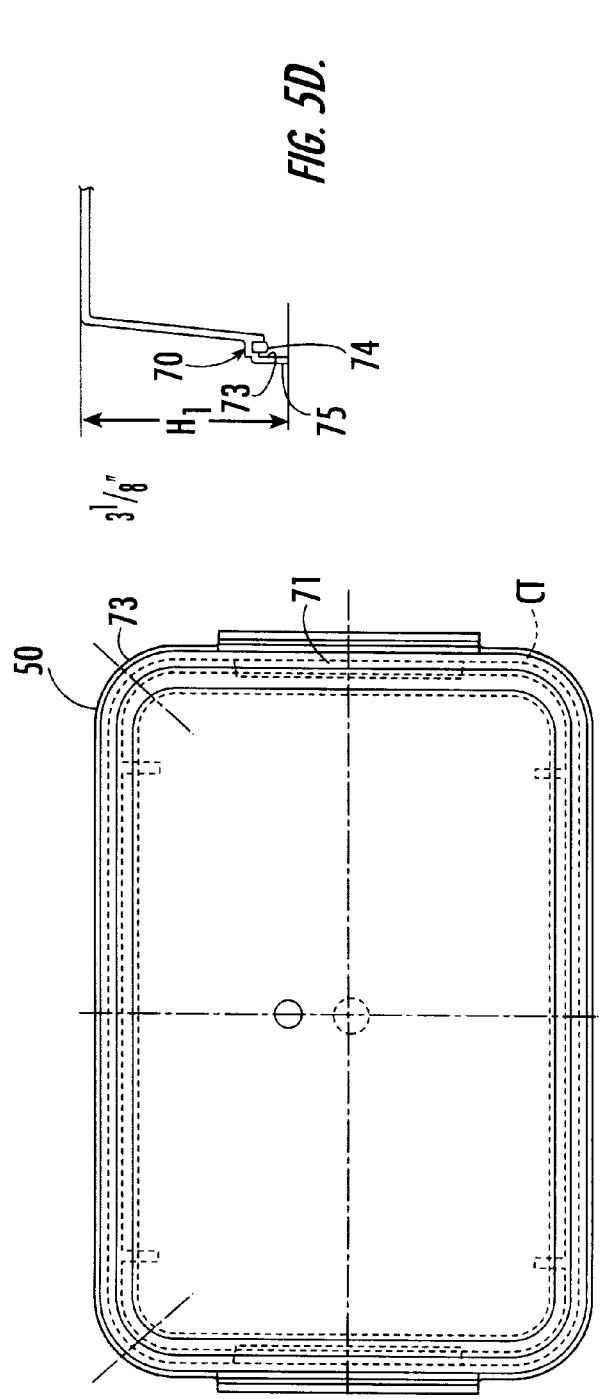
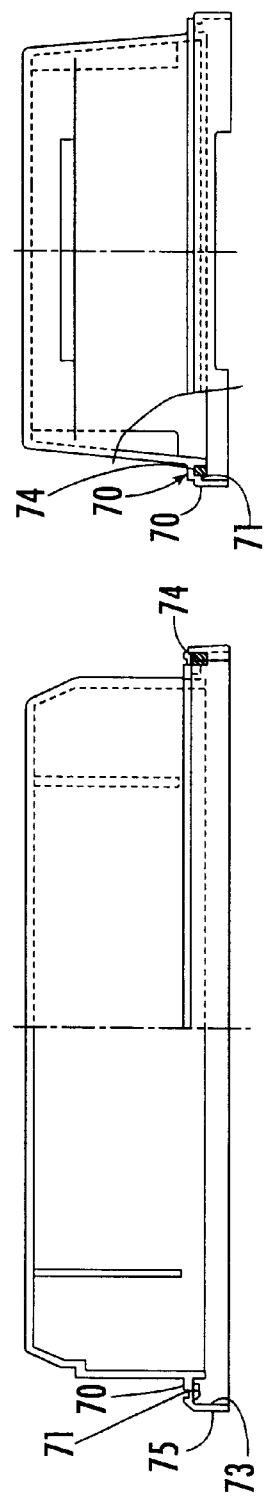

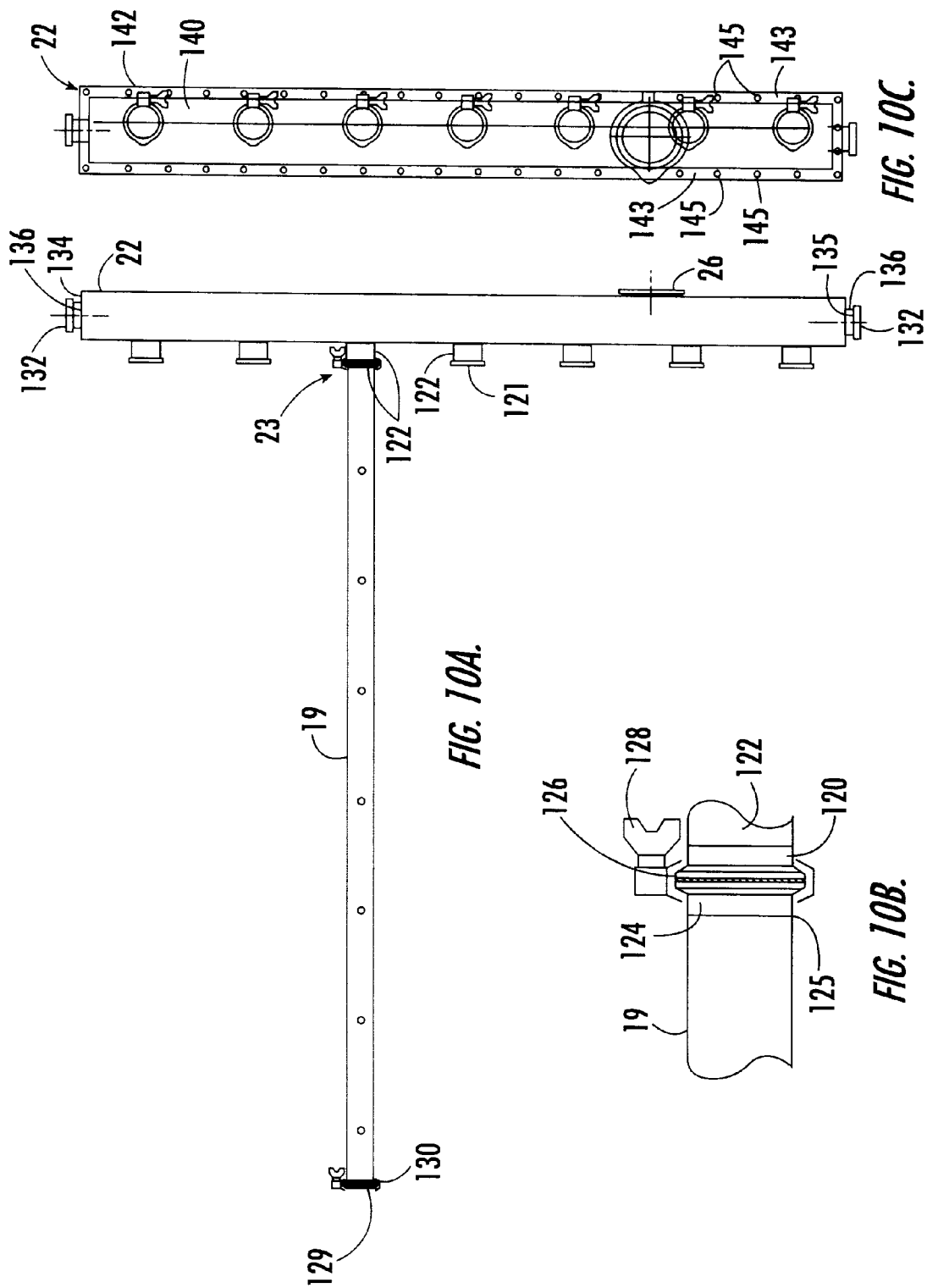

BIO-CONTAINMENT ANIMAL CAGE SYSTEM

BACKGROUND OF THE INVENTION

1. Field of the Invention

This invention relates to a bio-containment animal cage system in which individually self-sealing cages are received in a rack having a sealed air delivery and removal system, thereby providing improved animal isolation and containment of air-borne pathogens and viruses within the animal cage system.

2. Related Art

Ventilated animal cage systems in which cages are supported by a rack and air is supplied and removed from the rack are known. U.S. Pat. No. 4,528,941 describes a modular assembly with a plurality of cages supported by a free standing plenum. The plenum supplies and exhausts air to the cages. The cages are connected to the plenum by inlet and outlet tubes.

U.S. Pat. No. 5,000,120, issued to one of the inventors of this disclosure, describes a combination cage and rack system in which a forced air ventilation system is coupled to the cage when placed on the rack. Each cage includes a bonnet section and is supported at the periphery by a bottom section. An air filter is formed in an open top of the bonnet section. The air is directed down to the floor of the cage and circulates around towards the bonnet filter. Circulated air passes out from the cage through the bonnet filter and under the rim of the bonnet to an air exhaust manifold.

U.S. Pat. No. 5,307,757, also issued to one of the inventors of this disclosure, describes an animal cage system in which the cages include a top section supported by a bottom section at the periphery thereof. The cage can include a solid upper surface for preventing exhaust air from escaping through the top of the cage. A spacer bracket is located between the top and bottom sections of the cage to allow air that has circulated the cage to be withdrawn from the periphery of the cage to an exhaust manifold.

It is desirable to provide an animal cage system having improved containment of airborne contaminants, thereby providing increased isolation of animals for highly sensitive animal studies.

SUMMARY OF THE INVENTION

The present invention comprises an animal caging system including a self-sealing animal cage removably connected to an air supply and an exhaust. The self-sealing animal cage is supported by a rack. The self-sealing animal cage is sealed by an air inlet connection and an air outlet connection to the air supply and the exhaust connection. After the cages are removed from the air supply and the exhaust, the air inlet connection and the exhaust connection seals the cage to prevent air from entering or exiting the cage. Accordingly, the animal caging system provides isolation of the self-sealing animal cage and provides containment of airborne pathogens within the caging system.

In a preferred embodiment, the air inlet connection and exhaust connection are formed of a female automatic sealing entry port and a male automatic sealing entry port. The female automatic sealing entry port of the air inlet connection and the exhaust connection are coupled to respective apertures in the cage. The male automatic sealing entry port of the inlet connection is coupled to the air supply. The male automatic sealing entry port of the outlet connection is coupled to the exhaust. Accordingly, the female automatic sealing entry port seals the air inlet connection and the exhaust outlet connection of self-sealing animal cage when self-sealing animal cage is removed from rack. The male self-sealing entry port seals horizontal air supply plenum and male automatic sealing entry port seals horizontal exhaust plenum when the self-sealing animal cage is removed from rack.

The air supply and exhaust are provided with an air delivery and exhaust apparatus side mounted to the rack. The air delivery and exhaust apparatus is integrated with high efficiency particulate air (HEPA) filters. The air delivery and exhaust apparatus operates in a positive pressure mode for pushing air into the cage or in a negative mode for withdrawing air from the cage. Accordingly, air from the environment is HEPA filtered and is used as supply air in the air delivery and exhaust apparatus and exhaust air from the air delivery and exhaust apparatus is HEPA filtered before being emitted into the environment.

In an embodiment of the present invention, a bio-sensing cage, which contains an animal, is connected to the air supply and exhaust in order to measure pressure in the biosensing cage. The measurement of pressure in the bio-sensing cage is used by a controller to maintain pressure in the cages independently of environment and cage conditions. The measurement of pressure in the bio-sensing cage can be displayed. An alarm can be activated if the measured pressure in the cage is outside a predetermined tolerance for the cage.

The invention will be more fully described by reference to the following drawings.

BRIEF DESCRIPTION OF DRAWINGS

FIG. 2A illustrates a side perspective view of a self-sealing animal cage and connection to an air supply plenum and an exhaust plenum.

FIG. 2B illustrates an end elevational view of the self-sealing animal cage shown in FIG. 2A.

FIG. 3A illustrates a detailed side elevational of a male automatic sealing entry port disengaged from a female automatic sealing entry port.

FIG. 3B illustrates a detailed side elevational of a male automatic sealing entry port engaged with a female automatic sealing entry port.

FIG. 5A illustrates a top view of a top section of a self-sealing animal cage having a channel therein without a gasket seal.

FIG. 5B illustrates a side elevational view of the top section of the self-sealing animal cage.

FIG. 5C illustrates an end view of the self-sealing animal cage.

FIG. 5D illustrates a detailed view of a gasket seal in the channel of the top section.

FIG. 8 illustrates a bio-sensing cage used in the animal cage system shown in FIG. 1A.

FIG. 10A illustrates a schematic diagram of a connection of one horizontal air supply plenum to the vertical air supply plenum with a supply plenum connection.

FIG. 10B illustrates a perspective view of an embodiment of the supply plenum connection.

FIG. 10C is a cross sectional view of an embodiment of the vertical air supply plenum.

DETAILED DESCRIPTION

Figures 1A, 1B, 1C:
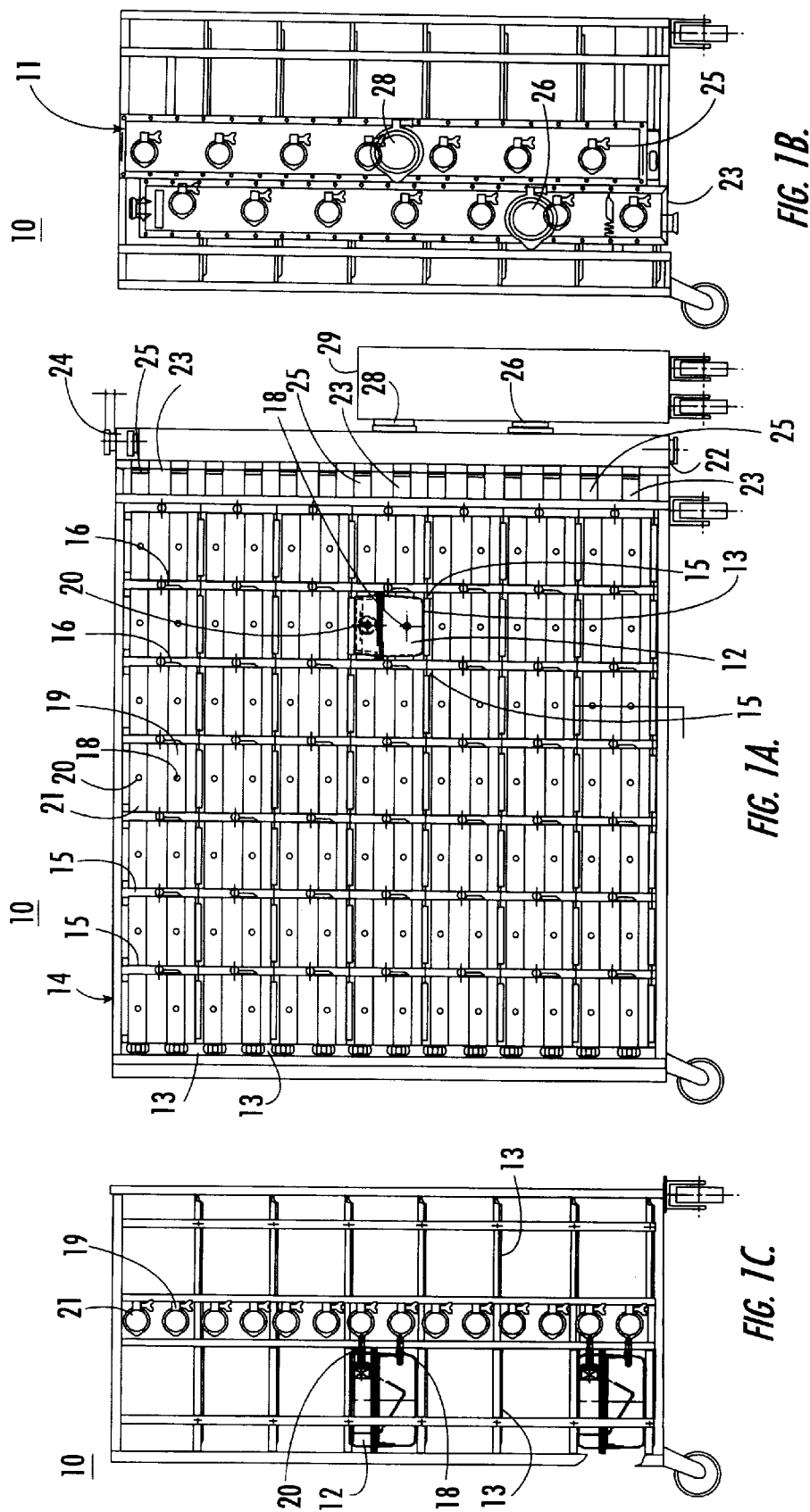
FIG. 1A illustrates a side elevational view of the bio-containment animal cage system in accordance with the teachings of the present invention.
FIG. 1B illustrates an end cross-section view of the system shown in FIG. 1A.
FIG. 1C illustrates an end cross-section view of the end opposite to the end shown in FIG. 1B.
Figure 1D:
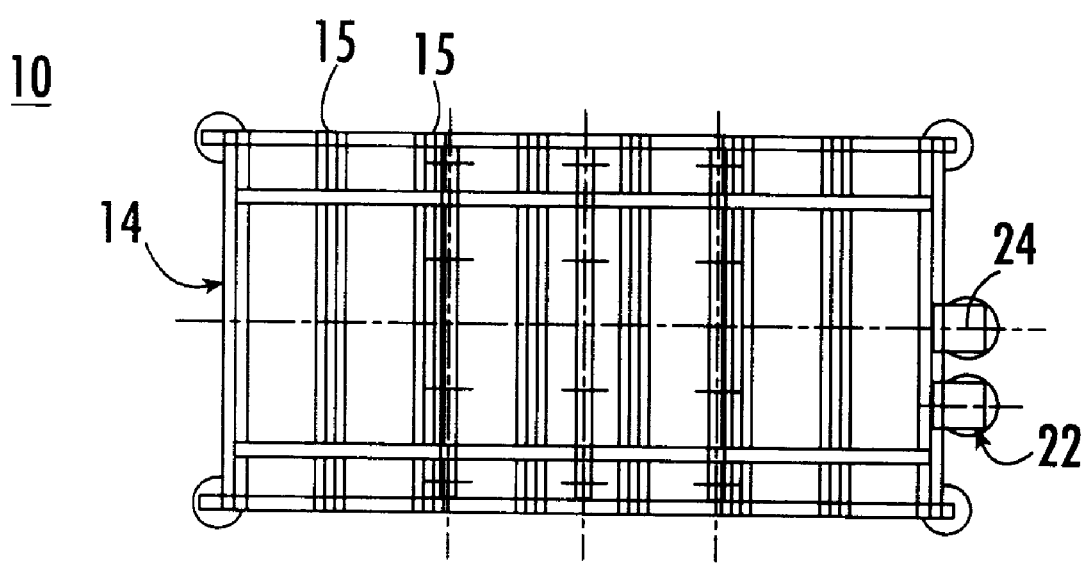
FIG. 1D illustrates a top view of the system shown in FIG. 1A.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1A–1D illustrate the bio-containment animal cage system 10 in accordance with the teachings of the present invention. Individual self-sealing animal cages 12 are supported on at least one platform 13 of rack 14. Preferably, platform 13 is substantially horizontal. Individual self-sealing cages 12 are guided into rack 14 with cage guides 15. Latch bracket 16 is attached to cage guides 15. After individual self-sealing cages 12 are inserted into rack 14, latch bracket 16 automatically locks self-sealing animal cages 12 to rack 14. For example, latch bracket 16 can be a quick disconnect locking mechanism which is engaged when self-sealing animal cage 12 is inserted into rack 14. Individual self-sealing animal cages 12 are sealed to prevent air from entering or exiting self-sealing animal cage 12 when self-sealing animal cage 12 is removed from rack 14.

The bio-containment rack and animal cage system 10 illustrated in FIG. 1A has seven platforms 13 located in rack 14. Each platform 13 includes eight cage guides 15 for accommodating seven self-sealing animal cages 12 between respective pairs of cage guides 15. Accordingly, bio-containment rack and animal system 10 can accommodate forty-nine self-sealing animal cages 12 on the front side and forty-nine cages on the rear side for a total of ninety-eight cages. The number of platforms 13 and cage guides 15 can be varied according to the needs of the user.

Air inlet connection 18 connects each self-sealing animal cage 12 to horizontal air supply plenum 19. Exhaust outlet connection 20 connects each self-sealing animal cage 12 to horizontal exhaust plenum 21. Air inlet connection 18 and exhaust outlet connection 20 are sealed when self-sealing animal cage 12 is removed from horizontal air supply plenum 19 and horizontal exhaust plenum 21. Supply plenum connection 23 connects horizontal air supply plenum 19 to vertical air supply plenum 22. Exhaust plenum connection 25 connects horizontal exhaust plenum 21 to vertical exhaust plenum 24. It will be appreciated that horizontal air supply plenum 19 and horizontal exhaust plenum 21 can be angled from the horizontal and vertical air supply plenum 22 and vertical exhaust plenum 24 can be angled from vertical. Air supply connection 26 connects vertical air supply plenum 22 and exhaust connection 28 connects vertical air exhaust plenum 24 to air delivery and exhaust apparatus 29.

FIGS. 2A and 2B illustrate a preferred embodiment of a self-sealing animal cage 12 connected to horizontal air supply plenum 19 and horizontal exhaust plenum 21. Air inlet connection 18 comprises male automatic sealing entry port 30a and female automatic sealing entry port 32a. Exhaust outlet connection 20 comprises male automatic sealing entry port 30b and female automatic sealing entry port 32b.

Conduit 33a is formed on side surface 34a of horizontal air supply plenum 19 and conduit 33b is formed on side surface 34b of horizontal exhaust plenum 21. Conduits 33a and 33b are attached to respective end 35a or end 35b of male automatic sealing entry ports 30a and 30b. Female automatic sealing entry ports 32a and 32b are received over respective end 36a or 36b of male automatic sealing entry ports 30a and 30b. Preferably, end 36a and 36b of male automatic sealing entry ports 30a and 30b provide a friction fit to respective female automatic sealing entry ports 32a and 32b.

Female automatic sealing entry port 32a of air inlet connection 18 is attached adjacent aperture 37 in wall 38 of bottom section 39 of self-sealing animal cage 12. Protection nozzle 40 surrounds aperture 37 on the inside of self-sealing animal cage 12 and prevents animals from accessing female automatic sealing entry port 32a. End 41 of protection nozzle 40 connects to female automatic sealing entry port 32a. For example, protection nozzle 40 can connect to female automatic sealing entry port 32a with a threaded connection. O-ring seal 42 is positioned between aperture 37 and outer surface 44 of protection nozzle 40 for sealing protection nozzle 40 to self-sealing animal cage 12.

At least one air opening 45 is formed in end 46 of protection nozzle 40 for emitting air 47 into cage 12 in the direction of arrow $A_i$. Preferably, a plurality of air openings 45 are formed in end 46. For example, four air openings 45 can be formed in protection nozzle 40. Air 47 circulates self-sealing animal cage and exits self-sealing animal cage 12 in the direction of arrow $A_o$.

Female automatic sealing entry port 32b of exhaust outlet connection 20 is attached adjacent aperture 48 in wall 49 of top section 50 of self-sealing animal cage 12. Filter housing coupling 51 surrounds aperture 48 on the inside of self-sealing animal cage 12. End 52 of filter housing coupling 51 connects to female automatic sealing entry port 32b. For example, filter housing coupling 51 can connect to female automatic sealing entry port 32b with a threaded connection or quick disconnect. Filter housing 53 is removably coupled to filter housing coupling 51. Filter medium 54 is positioned within filter housing 53. Filter medium 54 collects animal hair and dander for preventing the animal hair and dander from clogging exhaust outlet connection 20. Preferably, filter medium 54 can be a two-part medium formed of plastic or rubber foam and spun bound polyester. Alternatively, filter medium 54 can be a HEPA filter. O-ring seal 55 is positioned between aperture 49 and filter housing coupling 51 for sealing filter housing coupling 51 to self-sealing animal cage 12.

Preferably, male automatic sealing entry ports 30a and 30b and female automatic sealing entry ports 32a and 32b are self-sealing valves that remain closed until opened by the insertion of the respective male automatic sealing entry port 30a or 30b into female automatic sealing entry port 32a or 32b. Accordingly, female automatic sealing entry port 32a seals air inlet connection 18 and female automatic sealing entry port 32b seals exhaust outlet connection 20 of self-sealing animal cage 12 when self-sealing animal cage 12 is removed from rack 14. Male automatic sealing entry port 30a seals horizontal air supply plenum 19 and male automatic sealing entry port 30b seals horizontal exhaust plenum 21 when self-sealing animal cage 12 is removed from rack 14.

For example, O-ring 56 and spring 57 can be used for closing male automatic sealing entry port 30b and O-ring 58 and spring 59 can be used for closing female automatic sealing entry port 32b, as shown in FIGS. 3A and 3B. As shown in FIG. 3A, in the disengaged position of male automatic sealing entry port 30b, spring 57 biases O-ring 56 against interior portion 200 of male automatic sealing entry port 30b. O-ring 56 is positioned over shaft 201 of plunger 202. Closed end 203 of plunger 202 and O-ring 56 seal interior portion 200 of male automatic sealing entry port 30b. In the disengaged position of female automatic sealing entry port 32b, spring 59 biases O-ring 58 against interior portion 204 of female automatic sealing entry port 32b. O-ring 58 is positioned over shaft 205 of plunger 206. Closed end 207 of plunger 206 and O-ring 58 seal interior portion 204 of female automatic sealing entry port 32b. Exiting air 47 is trapped within female automatic sealing entry port and closed end 207. External O-ring 208 is positioned over end 36b of male automatic sealing entry port 30b.

As shown in FIG. 3B, in the engaged position of male automatic sealing entry port 30b with female automatic sealing entry port 32b, end 36b of male automatic sealing entry port 30b depresses spring 59 to disengage O-ring 58 from interior portion 204 and end 208 of female automatic sealing entry port 32b depresses spring 57 to disengage O-ring 56 from interior portion 200. In the engaged position, exiting air 47 from filter housing 53 flows around O-ring 58, spring 59, O-ring 56 and spring 57 to enter horizontal exhaust plenum 21. External O-ring 208 seals male automatic sealing entry port 30b to female automatic sealing entry port 32b. It is appreciated that a similar spring and O-ring assembly can be used for sealing male automatic sealing entry port 30a and female automatic sealing entry port 32b. For example, male automatic sealing entry ports 30a and 30b and female automatic sealing entry ports 32a and 32b can be manufactured by Colder Products Corp., Minnesota as JG Push-in connections.

In an alternate embodiment air inlet connection 18 is coupled to top section 50 of self-sealing animal cage 12 and exhaust connection 20 is coupled to bottom section 39 of self-sealing animal cage 12. Air 47 enters top section 50 from air inlet connection 18 and circulates self-sealing animal cage 12. Exhaust exits from bottom section 39 to exhaust outlet connection 20.

Figure 4:
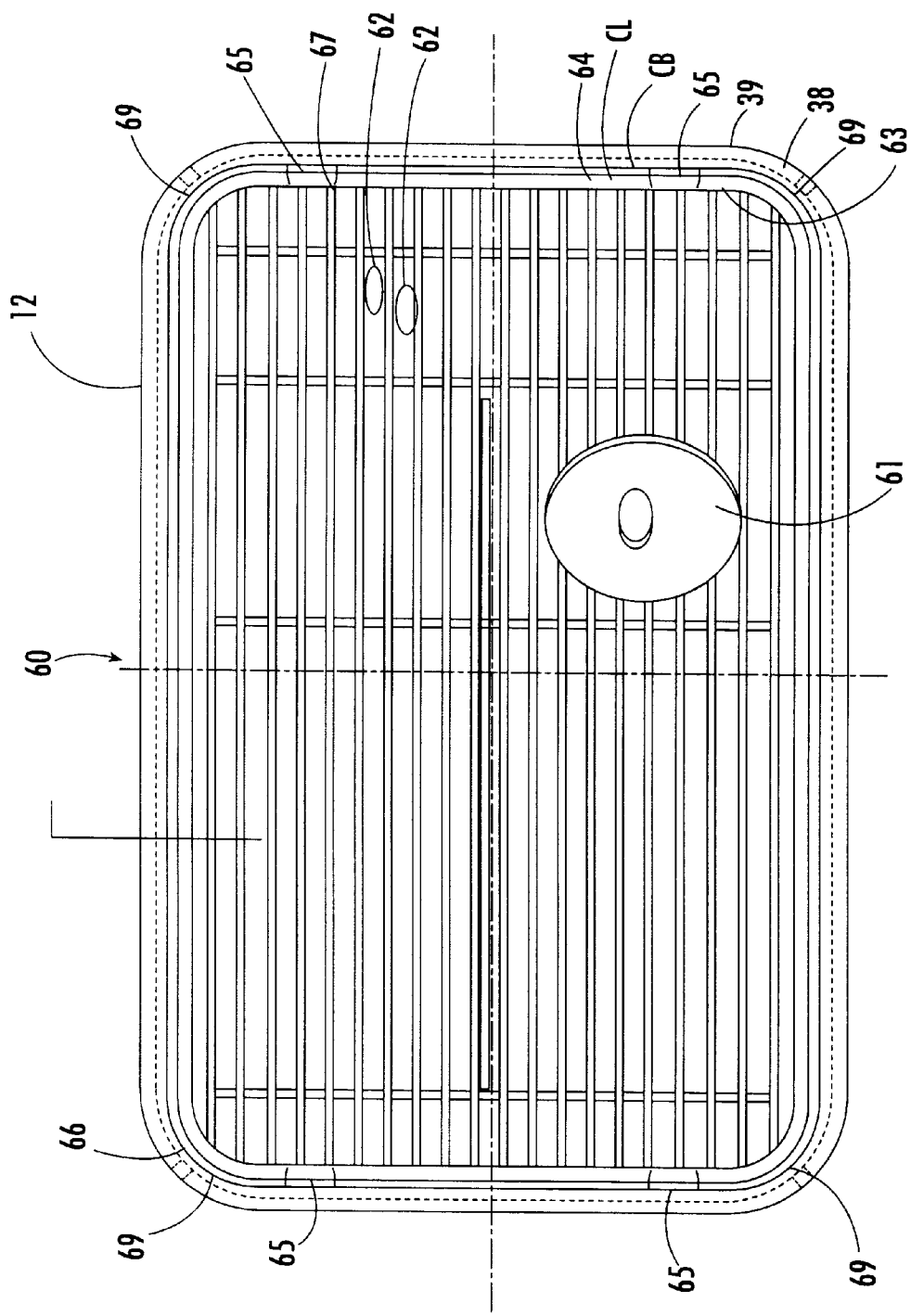
FIG. 4 is a top plan view of a food and water suspension lid suspended in the self-sealing animal cage shown in FIG. 2A.
Figure 5E:
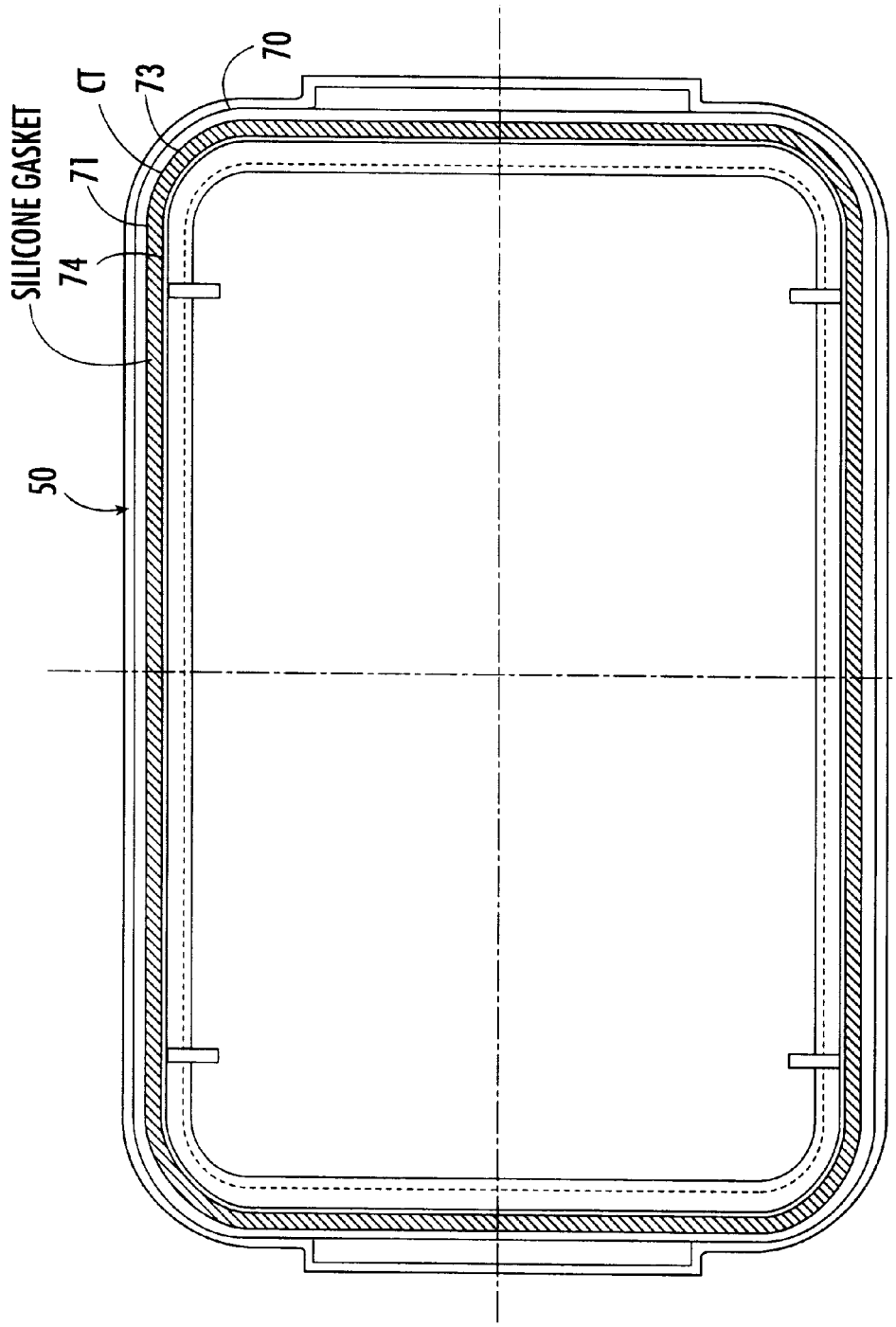
FIG. 5E illustrates a bottom plan view of the gasket seal in the top section.

Food and water suspension lid 60 can be suspended within self-sealing animal cage 12, as shown in FIG. 2A. Water dispenser holder 61 and food 62 is supported by a plurality of wires 67 forming bottom surface 68 of food and water suspension lid 60, as shown in FIG. 4. Food and water suspension lid 60 includes edge 64 having a circumference $C_L$ which is slightly smaller than inner circumference $C_B$ of bottom section 39 of self-sealing animal cage 12. For example, circumference $C_L$ can be about 0.05 to 0.25 inches smaller than the inner circumference $C_B$ of bottom section 39. Edge 64 is supported by at least one block 65 mounted to inner surface 63 of cage wall 38 of bottom section 39. At least one block 65 is positioned at a distance $D_1$ from rim 66 of bottom section 39, thereby recessing food and water suspension lid 60 below rim 66 and allowing rim 66 to be sealed to top section 50 of self-sealing animal cage 12, as described in detail below. Preferably, circumference $C_L$ and circumference $C_B$ have a rectangular shape. In this embodiment, four blocks 65 are mounted adjacent each corner 69 of bottom section 39 for supporting edge 64. Alternatively, circumference $C_L$ and circumference $C_B$ can have a varied geometric shape.

FIGS. 5A–5E illustrate detailed views of top section 50 of self-sealing animal cage 12. Preferably, top section 50 is a molded integral solid piece. For example, top section 50 can be formed of plastic. Top section 50 can have a height which is smaller than the height of convention animal cages for reducing the height of rack 14. For example, top section 50 can have a height of about three and an eighth inches.

Rim 70 is formed at the periphery of top section 50. Channel 71 is formed around circumference $C_T$ of inner portion 73 of rim 70. Gasket seal 74 is inserted in channel 71. Preferably, gasket seal 74 is formed of a flexible material to allow gasket seal 74 to be pressed into channel 71 and to be retained by channel 71. Thereafter, for cleaning or replacing gasket seal 74, gasket seal 74 can be removed from channel 71 by lifting under gasket seal 74 to lift gasket seal 74 out of channel 71. For example, gasket seal 74 can be formed of silicone rubber.

Rim 66 of bottom section 39 has a circumference $C_{BR}$ that is substantially the same as circumference $C_T$ of inner portion 73 of rim 70 of top section 50, as shown in FIG. 2A. Rim 66 is pressed against gasket seal 74 for sealing top section 50 to bottom section 39 of self-sealing animal cage 12. Protrusion 75 of rim 70 extends over rim 66.

Figure 6B:
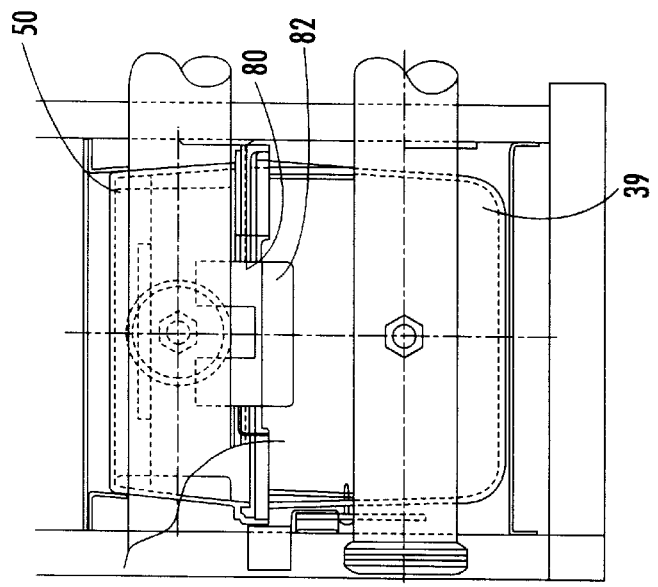
FIG. 6B illustrates an end view of the locking device attached to a self-sealing animal cage.
Figure 6A:
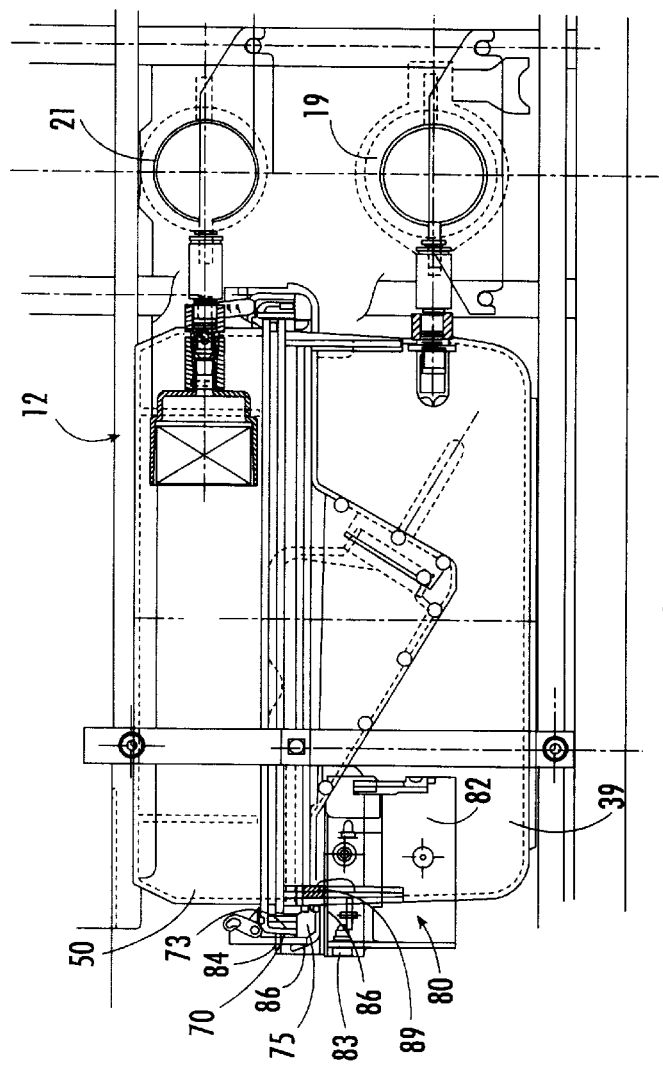
FIG. 6A illustrates a side perspective view of a locking device attached to a self-sealing animal cage.

FIGS. 6A and 6B illustrate locking device 80 that can be attached to self-sealing animal cage 12 for locking top section 50 to bottom section 39. Plate 82 mounts locking device 80 to bottom section 39. Alternatively, locking device 80 can be mounted to top section 50. Latch 84 extends from plate 82. Latch 84 is rotatable between a locked position contacting rim 70 of top section 50 and outer surface 83 of bottom section 39, thereby locking top section 50 to bottom section 39, and an unlocked position not contacting rim 70 and outer surface 83, thereby unlocking top section 50 from bottom section 39. Upper end 85 of latch 84 contacts protrusion 75 of rim 70 and lower end 86 of latch 84 contacts outer surface 83 of self-sealing animal cage 12 when latch 84 is rotated to the locked position. Alternatively, a seat 89 can be attached to outer surface 83 of bottom section 39 and lower end 86 of latch 84 contacts seat 89 when latch 84 is rotated to the locked position.

Figure 9:
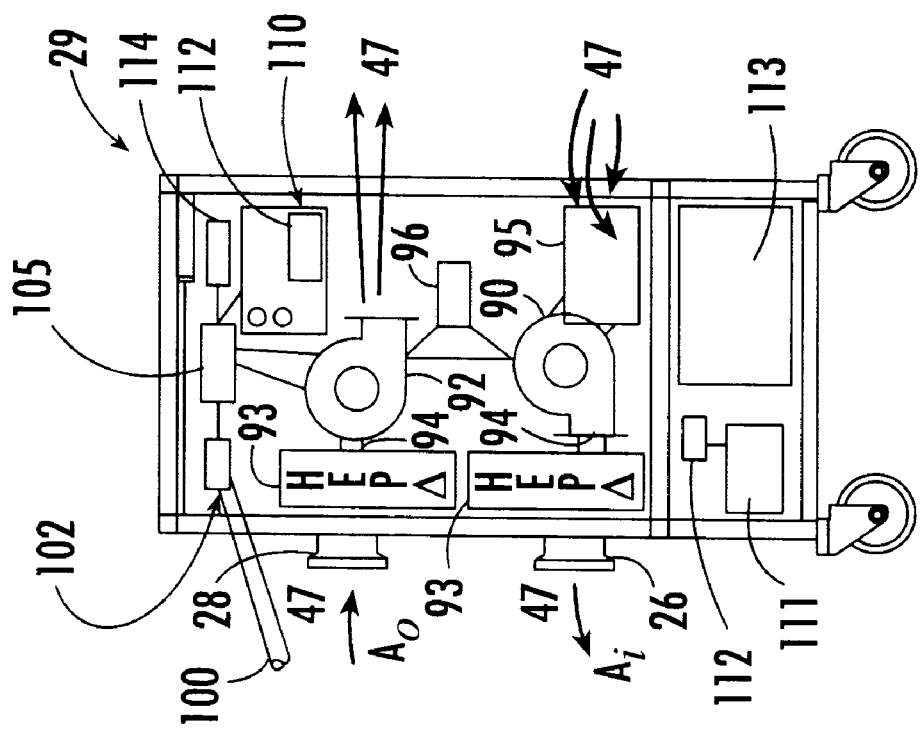
FIG. 9 illustrates a side view of the air delivery and exhaust apparatus including a display.
Figure 7:
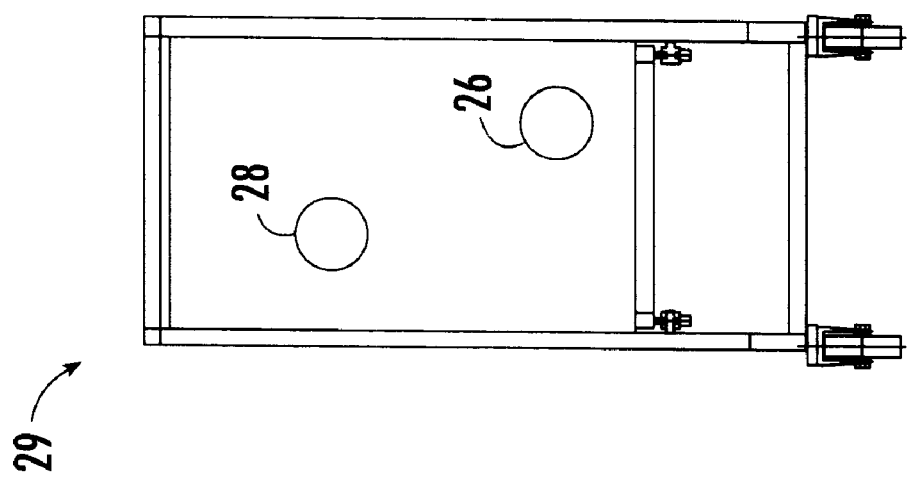
FIG. 7 illustrates an end view of an air delivery and exhaust apparatus used in the animal cage system.

Air delivery and exhaust apparatus 29 comprises at least one supply blower 90 and at least one exhaust blower 92, as shown in FIG. 7 and 9. Air supply connection 26 connects to supply blower 90. Exhaust connection 28 connects to exhaust blower 92. Preferably, a pair of supply blowers 90 and a pair of exhaust blowers 92 are used in air delivery and exhaust apparatus 29. The pair of supply blowers 90 and the pair of exhaust blowers 92 provide redundancy in case of failure of one supply blower 90 or exhaust blower 92.

High efficiency particulate air (HEPA) filter 93 is attached to end 94 of each supply blower 90 and exhaust blower 92. Pre-filter 95 can be attached to the inlet of supply blower 90. Air delivery and exhaust apparatus 29 operates in a positive air pressure mode in which blower 90 is activated and exhaust blower 92 is inactive, thereby positively pressurizing rack 14. Alternatively, air supply and delivery apparatus 29 operates in a negative pressure mode in which exhaust blower 92 is active and supply blower 90 is inactive, thereby negatively pressurizing rack 14. Supply blower 90 and exhaust blower 92 can be operated by switch 96 for switching between the positive pressure mode and the negative pressure mode. For example, switch 96 can be a key entry switch. Air 47 is pulled from the environment outside of air delivery exhaust apparatus 29 and is pre-filtered with pre-filter 95 before entering supply blower 90. Air from supply blower 90 is filtered with HEPA filter 93 before being pushed in the positive pressure mode into air supply connection 26. Exhaust from self-sealing animal cage 12 is pushed in the positive pressure mode or pulled in the negative pressure mode into exhaust connection 28 and is filtered with HEPA filter 93 before being exhausted into the environment outside of air delivery exhaust apparatus 29.

FIG. 8 illustrates an embodiment of bio-containment rack and animal cage system 10 including bio-sensing cage 12a. Air inlet connection 18 connects bio-sensing self-sealing animal cage 12a to horizontal air supply plenum 19. Exhaust outlet connection 20 connects bio-sensing cage 12a to horizontal exhaust plenum 21. During operation, bio-sensing self-sealing animal cage 12a contains an animal. It is anticipated that pressure in bio-sensing self-sealing animal cage 12a is substantially the same as the pressure in any self-sealing animal cage 12 attached to rack 14 containing an animal.

Flexible connection 100 connects to bio-sensing self-sealing animal cage 12a directly to pressure measurement device 102 of air supply air delivery apparatus 29. As shown in FIG. 9, pressure measurements in bio-sensing self-sealing animal cage 12a are determined at pressure measurement device 102 of air delivery and exhaust apparatus 29 from exhaust pressure entering air delivery and exhaust apparatus 29 from flexible connection 100. Pressure measurement device 102 also measures pressure of the environment outside rack 14 and air delivery exhaust apparatus 29. A differential pressure measurement is determined at pressure measurement device 102 from the difference between the pressure measurement for the environment and the pressure measurement of exhaust from bio-sensing self-sealing animal cage 12a. For example, pressure measurement device 102 can be manufactured by Kavlico as Part No. P593.

Air exhaust and delivery apparatus 29 includes controller 105 receiving the differential pressure measurement from pressure measurement device 102. Controller 105 maintains a pre-determined pressure in bio-sensing self-sealing animal cage 12a and self-sealing animal cage 12 which is independent of the number of self-sealing animal cages 12 coupled to rack 14 by increasing or decreasing the amount of air supplied by blower 90 in the positive mode or exhausted by exhaust blower 92 in the negative mode. For example, a differential pressure of about 0.5 inches of water plus or minus about 0.1 inches of water can be maintained in each self-sealing animal cage 12 and bio-sensing self-sealing animal cage 12a attached to rack 14.

During operation of bio-containment animal cage system 10, pressure exiting exhaust connection 20 is reduced as filter medium 54 in filter housing 53 of self-sealing animal cage 12 becomes clogged with animal hair, dander or other particulate matter. Speed of supply blower 90 or exhaust blower 92 is increased to the tolerance of the blower to maintain the predetermined pressure in bio-sensing self-sealing animal cage 12a and self-sealing animal cages 12 connected to rack 14. After supply blower 90 or exhaust blower 92 reaches its tolerance air delivery and exhaust apparatus 29 and self-sealing animal cages 12 and bio-sensing animal cage 12a which contained animals can be removed from rack 14. Thereafter, filter housing 53 can be removed from each of self-sealing animal cages 12 and bio-sensing self-sealing animal cage 12a that were connected to rack 14. Dirty filter medium 54 of each of self-sealing animal cages 12 is removed from filter housing 53 and bio-sensing self-sealing animal cage 12a and clean filter medium 54 is inserted into filter housing 53. HEPA filters 93 and pre-filters 95 can be observed to determine if the filters have been compromised and comprised filters can be replaced.

Pressure differential measurements can be displayed on display panel 110 of air supply and exhaust apparatus 29. For example, display panel 110 can include a light emitting diode (LED) 112 for displaying real time differential pressure measurements of bio-sensing cage 12a. Alternatively, display panel 110 can display the pressure measurement of exhaust from bio-sensing cage 12a and the pressure measurement for the environment.

Power supply 111 can be coupled to air delivery and exhaust apparatus 29 for powering air delivery and exhaust apparatus 29. Power switch 112 can be used to turn on and off air delivery and exhaust apparatus 29. Back up power supply 113 can be coupled to air delivery and exhaust apparatus 29 for powering air delivery and exhaust apparatus 29 in the event of a failure of power supply 111. For example, back up power supply 113 can be a battery. During battery operation, the pressure differential in self-sealing animal cages 12 and bio-sensing cage 12a can be reduced to enable less power to be used by supply blower 90 and exhaust blower 92, thereby extending the life of back up power supply 113.

Alarm 114 can connect to controller 105. Alarm 114 can be activated when supply blower 90 or exhaust blower 92 reaches its tolerance and is unable to maintain the predetermined pressure in bio-sensing animal cage 12a and self-sealing animal cage 12. Alternatively, controller 105 can include alarm output and a transmitter for remotely transmitting the alarm output to a remote location.

FIGS. 10A and 10B illustrate an embodiment of a supply plenum connection 23 removably connecting horizontal air supply plenum 19 to vertical air supply plenum 22. Ferrule 120 is positioned around aperture 121 on one of extensions 122 formed along vertical air supply plenum 22. Ferrule 124 is positioned around end 125 of horizontal air supply plenum 19. Gasket 126 is positioned between ferrule 120 and ferrule 124. Clamp 128 is tightened to clamp ferrule 120 to ferrule 124. End cap 129 is connected to end 130 of horizontal air supply plenum 19 for closing end 130.

Clamp 128 can be untightened to release ferrule 120 from ferrule 124 for cleaning horizontal air supply plenum 19 after use of bio-containment animal cage system 10. This embodiment of a clamp and pair of ferrules can also be used for exhaust plenum connection 25 to removably connect horizontal exhaust plenum 21 to vertical exhaust plenum 24. This embodiment of a clamp and pair of ferrules can also be used for air supply connection 26 for removably connecting vertical air supply plenum 22 to air delivery and exhaust apparatus 29 and exhaust connection 28 for removably connecting vertical exhaust plenum 24 to air delivery and exhaust apparatus 29, shown in FIG. 1A.

Ferrule 132 can be attached to an aperture 136 in end 134 and end 135 of vertical air supply plenum 22. Ferrules 132 are removed from vertical air supply plenum 22 for cleaning vertical air supply plenum 22 after use of bio-containment system 10. Ferrules 122 can also be used in vertical exhaust plenum 24.

For example, supply plenum connection 23 and exhaust plenum connection 25 can be formed of sanitary piping clamp connections, such as 2" welding and clamp fitting, as manufactured by VNE Corporation, Wisconsin. Air supply connection 26 and exhaust connection 28 can be formed of sanitary piping clamp connections such as 4" welding ferrule and clamp fittings, as manufactured by VNE Corporation, Wisconsin.

FIG. 10C illustrates an embodiment of vertical air supply plenum 22. Vertical air supply plenum 22 is formed of a pair of side portions 140 and 142. Gasket 143 is positioned between side portions 140 and 142. Side portion 140 is bolted to side portion 142 with a plurality of bolts 143 according to National Sanitation Foundation (NSF)-49 specifications for providing sanitary manifolds. Bolts 145 can be removed for releasing side portion 140 from side portion 142 for cleaning of vertical air supply plenum 22 after use of bio-containment system 10. This embodiment can be used for vertical exhaust plenum 24.

It is to be understood that the above-described embodiments are illustrative of only a few of the many possible specific embodiments which can represent applications of the principles of the invention. Numerous and varied other arrangements can be readily devised in accordance with these principles by those skilled in the art without department from the spirit and scope of the invention.

We claim:

1. An animal cage system comprising:
   at least one self-sealing animal cage;
   a rack for supporting said at least one self-sealing animal cage;
   air supply means for supplying air to said self-sealing animal cage being removably connected with an air inlet connection to said self-sealing animal cage, said air inlet connection being coupled to said self-sealing animal cage; and
   exhaust means for removing exhaust from said self-sealing animal cage being removably connected with an exhaust outlet connection to said self-sealing animal cage, said exhaust outlet connection being coupled to said self-sealing animal cage;
   said air inlet connection being sealed when said air inlet connection is removed from said air supply means and said exhaust outlet connection being sealed when said exhaust outlet connection is removed from said exhaust means.

2. The animal cage system of claim 1 wherein said air supply means comprises an air supply plenum and said exhaust means comprises an exhaust plenum said air supply plenum and said exhaust plenum being connected to an air delivery and exhaust apparatus.

3. The animal cage system of claim 2 wherein said rack comprises a plurality of platforms and further comprises:
   a plurality of said air supply plenums and a plurality of said exhaust plenums, each pair of said air supply plenums and said exhaust plenums being associated with one of said plurality of platforms; and
   a plurality of said self-sealing animal cages being supported by said plurality of platforms.

4. The animal cage system of claim 3 wherein said air supply means further comprises:
   a vertical air supply plenum connected with a plurality of supply plenum connections to said plurality of said air supply plenums;
   a vertical exhaust plenum connected with a plurality of exhaust plenum connections to said plurality of exhaust plenums, said vertical air supply plenum and said vertical exhaust plenum being connected to said air delivery and exhaust apparatus,
   wherein said vertical air supply plenum and said vertical exhaust plenum are positioned on the same side of said rack.

5. The animal cage system of claim 4 wherein said plurality of exhaust plenum connections and said plurality of supply plenum comprise:
   a first ferrule coupled to said air supply plenum or said exhaust plenum;
   a second ferrule attached to a respective exterior of said vertical air supply plenum and said vertical exhaust plenum;
   a gasket positioned between said first ferrule and said second ferrule; and
   a removable clamp clamping said first ferrule to said second ferrule.

6. The animal cage system of claim 4 wherein said vertical exhaust plenum and said vertical air supply plenum comprise:
   a pair of side portions;
   a gasket positioned between said side portions; and
   a plurality of bolts for bolting said pair of side portions together.

7. The animal cage system of claim 1 wherein said air inlet connection and said exhaust connection comprise
   a female automatic sealing entry port; and
   a male automatic sealing entry port,
   wherein said male automatic sealing entry port is adapted to be received in said female automatic sealing entry port.

8. The animal cage system of claim 7 wherein said male automatic sealing entry port and said female automatic sealing entry port are closed until opened by the insertion of said male automatic sealing entry port into said female automatic sealing entry port, said female automatic sealing entry port of said air inlet connection seals said air inlet connection of said self-sealing animal cage, said female automatic sealing entry port of said exhaust outlet connection seals said exhaust outlet connection of said self-sealing animal cage, said male automatic sealing entry port of said air inlet connection seals said air supply means and said male automatic sealing entry port of said exhaust outlet connection seals said exhaust means.

9. The animal cage system of claim 8 wherein said air inlet connection is coupled to a bottom section of said cage and surrounds a first aperture in said cage in a first wall of said bottom section said exhaust outlet connection is coupled to a top section of said cage and surrounds a second aperture in said cage in a second wall of said top section.

10. The animal cage system of claim 9 further comprising:
    a protection nozzle positioned over said first aperture, said protection nozzle having a first end adapted to be connected to said female automatic entry port of said air inlet connection and said connection nozzle having at least one opening formed in a second end extending into said cage.

11. The animal cage system of claim 10 wherein said protection nozzle is connected to said female automatic sealing entry port with a threaded connection.

12. The animal cage system of claim 11 wherein said protection nozzle has a plurality of said openings formed in said second end extending into said cage.

13. The animal cage system of claim 12 further comprising:

a first O-ring seal positioned between an outside surface of said protection nozzle and said first aperture.

14. The animal cage system of claim 8 wherein said air inlet connection is coupled to a top section of said cage and surrounds a first aperture in said cage in a first wall of said top section and said exhaust outlet connection is coupled to a bottom section of said cage and surrounds a second aperture in said cage in a second wall of said bottom section.

15. The animal cage system of claim 14 further comprises:
a removable filter housing positioned over said second aperture.

16. The animal cage system of claim 15 further comprising a filter housing coupling for coupling said filter housing to said self-sealing animal cage, said filter housing coupling having a first end adapted to be connected to said female automatic sealing entry port of said exhaust outlet connection.

17. The animal cage system of claim 16 wherein a filter medium is positioned within said filter housing.

18. The animal cage system of claim 17 wherein said filter medium is formed of plastic foam or rubber foam and spun bound polyester.

19. The animal cage system of claim 16 further comprising:
a second O-ring seal positioned between an outside surface of said filter housing coupling and said second aperture.

20. The animal cage system of claim 1 further comprising:
a food and water suspension lid suspended within said self-sealing animal cage.

21. The animal cage system of claim 20 wherein said food and water suspension lid comprises an edge, said edge having circumference which is slightly smaller than a circumference of an inner circumference of a bottom section of said self-sealing animal cage; and
a plurality of wires connected to said edge, said plurality of wires adapted to hold food and a water dispenser.

22. The animal cage system of claim 21 further comprising:
at least one block attached to an inner wall of said bottom section, said edge of said food and water suspension lid being received or said block, wherein said block is positioned at a distance from a rim of said bottom section for recessing said food and water suspension lid below said rim.

23. The animal cage system of claim 22 wherein said edge has a rectangular circumference and further comprising:
a plurality of said blocks, each of said blocks being positioned at a corner of said edge.

24. The animal cage system of claim 1 wherein said self-sealing animal cage comprises:
a top section; and
a bottom section, said top section being sealed to said bottom section.

25. The animal cage system of claim 24 wherein a wall of said top section has a first rim at a periphery thereof, a channel is formed around an inner portion of said rim and a gasket seal is adapted to be received in said channel, and a wall of said bottom section having a rim at an upper portion thereof, said rim of said bottom section being adapted to be pressed against said gasket seal for sealing said top section to said bottom section.

26. The animal cage of claim 25 wherein said gasket seal is removable from said channel.

27. The animal cage system of claim 26 wherein said gasket seal is formed of silicone rubber.

28. The animal caging system of claim 24 wherein said top section is solid.

29. The animal caging system of claim 28 wherein said top section is formed of molded polysulfone.

30. The animal cage system of claim 29 further comprising latching means for latching said top section to said bottom section.

31. The animal cage system of claim 30 wherein said, latching means comprises:
a plate mounted to said bottom section;
a rotatable latch extending from said plate, said latch contacting a rim of said top section and an outer surface of said bottom section.

32. The animal cage system of claim 1 wherein said air supply means comprises at least one supply blower and said exhaust means comprises at least one exhaust blower.

33. The animal cage system of claim 32 further comprising a high efficiency filter attached to each of said supply blower and said exhaust blower for filtering air entering or exiting said supply blower or said exhaust blower.

34. The animal cage system of claim 33 wherein said air supply means operates in a positive pressure mode in which said supply blower is active and said exhaust blower is inactive for pushing air into said self-sealing animal cage.

35. The animal cage system of claim 33 wherein said air supply means operates in a negative pressure mode in which said exhaust blower is active and said supply blower is inactive for pulling air from said self-sealing animal cage.

36. The animal cage system of claim 33 further comprising:
a pair of said supply blowers and a pair of said exhaust blowers.

37. The animal cage system of claim 1 further comprising
a bio-sensing self-sealing animal cage being removably connected to said air supply means with said air inlet connection and being removably connected to said exhaust means with said exhaust connection; and
a flexible hose between said bio-sensing self-sealing animal cage and a pressure measurement device, said pressure measurement device measuring pressure exiting said bio-sensing self-sealing animal cage.

38. The animal cage system of claim 37 further comprising:
wherein said pressure measurement device measures pressure of the environment outside said rack and said pressure measurement device determines a differential pressure measurement from the difference between the measured pressure of the environment and the measured pressure exiting bio-sensing self-sealing animal cage.

39. The animal cage system of claim 38 further comprising a display for displaying said differential pressure measurement.

40. The animal cage system of claim 39 wherein said display is a light emitting diode, said light emitting diode displaying said differential pressure measurements in real time.

41. The animal caging system of claim 37 wherein said air supply means comprises at least one supply blower and said exhaust means comprises at least one exhaust blower and further comprising:
controlling means for controlling the pressure in said self-sealing animal cage and said bio-sensing self-sealing animal cage by controlling the speed of said at least one supply blower or the speed of said at least one exhaust blower.

42. The animal cage system of claim 1 further comprising an alarm means for activating an audible alarm when said speed of said supply blower or said speed of said exhaust blower exceeds a tolerance.

43. The animal cage system of claim 1 further comprising:
a plurality of cage guides attached to said rack, said cage being received between a pair of said cage guides; and
a latching device for automatically locking said self-sealing animal cage to said cage guides.

44. A method of maintaining pressure in an animal cage system comprising the steps of:
placing a bio-sensing self-sealing animal cage on a rack for supporting said cage;
removably connecting an air supply means for supplying air to said bio-sensing self-sealing animal cage and an air exhaust means for removing exhaust from said bio-sensing self-sealing animal cage;
measuring pressure in said bio-sensing cage with a pressure measurement means; and
controlling said air supply means or said air exhaust means in response to the measured pressure in the bio-sensing cage, thereby maintaining a predetermined pressure in said bio-sensing cage.

45. The method of claim 44 further comprising the step of:
activating an alarm when a tolerance of said predetermining pressure in said bio-sensing cage is exceeded.

46. The method of claim 45 further comprising the step of:
placing self-sealing animal cages on said rack for supporting said cage; and
removably connecting said air supply means for supplying air to said self-sealing animal cage and said air exhaust means for removing exhaust from said self-sealing animal cage.

47. The method of claim 46 wherein in said placing step, each said self-sealing bio-sensing animal cage and said self-sealing animal cage comprise a filter housing attached to the inside of said self-sealing bio-sensing animal cage and said self-sealing animal cage and a filter medium received in said filter housing and further comprising the steps of:
after the step of activating said alarm removing said filter medium from said filter housing; and
inserting clean filter medium into said filter housing.

48. The method of claim 47 wherein said air supply means and said air exhaust means comprise a high efficiency particulate filter and further comprising the steps of:
after the step of activating said alarm, observing said high efficiency particulate filter of said air supply means or said exhaust means; and
inserting a high efficiency particulate filter if said high efficiency particulate filter has been compromised.

49. A self-sealing animal cage comprising:
a top section;
a bottom section; and
sealing means for sealing said top section to said bottom section,
wherein a wall of said top section has a first rim at a periphery thereof, a channel is formed around an inner portion of said first rim and a wall of said bottom section has a rim at an upper portion thereof, a gasket seal received in said channel, wherein said rim of said bottom section being adapted to be pressed against said gasket seal for sealing said top section to said bottom section.

50. The cage of claim 49 wherein said gasket seal is removable from said channel.

51. The cage of claim 50 wherein said gasket seal is formed of silicone rubber.

52. The animal cage of claim 50 wherein said top section is solid.

53. The animal cage system of claim 52 wherein said top section is formed of plastic.

54. The animal cage of claim 49 wherein an air inlet connection is coupled to said bottom section of said cage and surrounds a first aperture in said cage in a first wall of said bottom section and an exhaust outlet connection is coupled to said top section of said cage and surrounds a second aperture in said cage in a second wall of said top section; and said inlet connection and said exhaust outlet connection being sealed.

55. The animal cage of claim 54 further comprising:
a protection nozzle positioned over said first aperture, said protection nozzle having a first end adapted to be connected to said air inlet connection and said connection nozzle having at least one opening formed in a second end extending into said-cage.

56. The animal cage of claim 55 wherein said protection nozzle has a plurality of said openings formed in said second end extending into said cage.

57. The animal cage of claim 55 wherein said protection nozzle is connected to said air inlet connection with a threaded connection.

58. The animal cage of claim 55 further comprising:
a first O-ring seal positioned between an outside surface of said protection nozzle and said first aperture.

59. The animal cage of claim 54 further comprising:
a removable filter housing positioned over said second aperture.

60. The animal cage of claim 59 further comprising:
a filter housing coupling for coupling said filter housing to said self-sealing animal cage, said filter housing coupling having a first end adapted to be connected to said exhaust outlet connection.

61. The animal cage of claim 60 wherein a filter medium is positioned within said filter housing.

62. The animal cage of claim 61 wherein said filter medium is formed of plastic foam or rubber foam and spun bound polyester.

63. The animal cage of claim 60 further comprising:
a O-ring seal positioned between an outside surface of said filter housing coupling and said second aperture.

64. A self-sealing animal cage comprising:
a top section;
a bottom section; and
sealing means for sealing said top section to said bottom section;
a food and water suspension lid suspended within said self-sealing animal cage,
wherein said food and water suspension lid comprises an edge, said edge having circumference which is slightly smaller than a circumference of an inner circumference of said bottom section of said self-sealing animal cage; and
a plurality of wires connected to said edge, said plurality wire adapted to hold food and a water disperses.

65. The animal cage of claim 64 further comprising:
at least one block attached to an inner wall of said bottom section, said edge of said food and water suspension lid being received or said block, wherein said block is positioned at a distance from a rim of said bottom section for recessing said food and water suspension lid below said rim.

66. The animal cage of claim 65 wherein said edge has a rectangular circumference and further comprising a plurality of said blocks, each of said block positioned at a corner of said edge.

* * * * *